United States Patent
Lin et al.

(10) Patent No.: US 10,416,727 B2
(45) Date of Patent: Sep. 17, 2019

(54) PIVOTING MECHANISM AND ELECTRONIC DEVICE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 16/140,570

(22) Filed: Sep. 25, 2018

(65) Prior Publication Data

US 2019/0094918 A1    Mar. 28, 2019

Related U.S. Application Data

(60) Provisional application No. 62/563,055, filed on Sep. 25, 2017.

(51) Int. Cl.
*G06F 1/16* (2006.01)

(52) U.S. Cl.
CPC .......... *G06F 1/1681* (2013.01); *G06F 1/166* (2013.01); *G06F 1/1616* (2013.01)

(58) Field of Classification Search
CPC ............................... G06F 1/166; G06F 1/1681
See application file for complete search history.

(56) References Cited

U.S. PATENT DOCUMENTS

| | | | | |
|---|---|---|---|---|
| 6,034,866 A | * | 3/2000 | Nobuchi | G06F 1/1626 248/298.1 |
| 8,014,147 B2 | * | 9/2011 | Chen | G06F 1/1616 200/61.62 |
| 8,879,251 B2 | * | 11/2014 | Hsiu | G06F 1/166 361/679.59 |
| 9,354,669 B2 | * | 5/2016 | Chen | G06F 1/1681 |
| 9,582,048 B2 | * | 2/2017 | Ho | G06F 1/1616 |
| 2011/0280428 A1 | | 11/2011 | Tseng et al. | |

FOREIGN PATENT DOCUMENTS

TW    M252226    12/2004

* cited by examiner

*Primary Examiner* — Adrian S Wilson
(74) *Attorney, Agent, or Firm* — JCIPRNET

(57) ABSTRACT

A pivoting mechanism is pivotally connected to a first body and a second body, and includes a rotating shaft, a linkage rod, a cover, a limiting element, a limiting slider, and a bracket. A central region of a pivoting portion of the linkage rod deviates from an axis of the rotating shaft. The limiting element is assembled to the cover and includes a protruding portion located in a first slide groove of the limiting slider and a second slide groove of the bracket. A second side of the linkage rod is connected to the limiting slider and the bracket. A shape of the first slide groove is different from that of the second slide groove. When the rotating shaft rotates, the limiting slider is driven via the linkage rod, so as to drive the protruding portion of the limiting element sliding in the first slide groove and the second slide groove, such that the cover is movable between a deployed position and a closed position.

28 Claims, 10 Drawing Sheets

US 10,416,727 B2

PIVOTING MECHANISM AND ELECTRONIC DEVICE

CROSS-REFERENCE TO RELATED APPLICATION

This application claims the priority benefit of U.S. provisional application Ser. No. 62/563,055, filed on Sep. 25, 2017. The entirety of the above-mentioned patent application is hereby incorporated by reference herein and made a part of this application.

BACKGROUND

Technical Field

The present invention relates to a pivoting mechanism and an electronic device, and more particularly, to a pivoting mechanism including a cover and an electronic device applied with the pivoting mechanism.

Description of Related Art

Most portable electronic devices reduce storage area by using a folding way to make electronic product light and thin. Generally, the portable electronic devices are mostly composed of a display module and a host module, wherein the display module and the host module are pivotally connected to each other. In this way, when a user opens or closes the portable electronic device, pivotal rotation between the display module and the host module can be achieved via a pivoting mechanism. However, a gap exists between the mechanism and the host mechanism, which not only exposes an internal structure of the host module, but also causes dust and impurities to enter the host module, thereby affecting operation of the host module. As a result, how to make the pivoting mechanism of the portable electronic device avoid exposure of the internal structure of the host module, while under a condition that pivot movement is steady and smooth, has become one of urgent problems to be solved.

SUMMARY

The present invention provides a pivoting mechanism including a cover that is slidably movable between a deployed position and a closed position.

The present invention further provides an electronic device including the cover of the pivoting mechanism that is slidably movable between the deployed position and the closed position, for covering a gap between a second body and the pivoting mechanism.

A pivoting mechanism is pivotally connected to a first body and a second body to allow rotation of the first body relative to the second body. The pivoting mechanism includes a rotating shaft, a linkage rod, a limiting element, a limiting slider, and a bracket. The rotating shaft has an axis. The linkage rod has a first side and a second side that are opposite to each other. The first side has a pivoting portion pivotally connected to the rotating shaft. A central region of the pivoting portion deviates from the axis of the rotating shaft. The cover is disposed between the first body and the second body. The limiting element is assembled to the cover and has a protruding portion. The limiting slider has a first slide groove. The bracket is fixed to the second body and has a second slide groove. The limiting slider is disposed between the limiting element and the bracket. The protruding portion of the limiting element passes through the first slide groove and the second slide groove. The second side of the linkage rod is connected to the limiting slider and the bracket via a connecting member. A shape of the first slide groove is different from a shape of the second slide groove. When the rotating shaft rotates, the limiting slider is driven via the linkage rod, so as to drive the protruding portion of the limiting element sliding in the first slide groove and the second slide groove, such that the cover is movable between a deployed position and a closed position.

In an embodiment of the present invention, the pivoting mechanism further includes a limiting ring disposed between the rotating shaft and the linkage rod. The pivoting portion of the linkage rod and an end of the rotating shaft are assembled to the limiting ring. When the limiting ring is rotated via the rotating shaft, a rotational displacement of the limiting ring limits a rotational displacement of the linkage rod.

In an embodiment of the present invention, the cover includes a plate and a fixing seat that is fixed on the plate. The limiting element is assembled to the fixing seat.

In an embodiment of the present invention, the fixing seat has a first engaging portion. The limiting element has a second engaging portion engaging the first engaging portion, such that the limiting element is assembled to the fixing seat.

In an embodiment of the present invention, the protruding portion of the limiting element extends along a first direction. The first slide groove of the limiting slider extends along a second direction. The first direction is perpendicular to the second direction. The first slide groove limits sliding movement of the protruding portion of the limiting element in the second direction.

In an embodiment of the present invention, the connecting member passes through the bracket, the limiting slider, and the second side of the linkage rod, so as to be assembled to the limiting slider and the bracket.

In an embodiment of the present invention, the limiting slider further has a limiting groove. The bracket further has an assembled groove. The second side of the linkage rod has an assembled hole. The connecting member passes sequentially through the assembled groove, the limiting groove, and the assembled hole. When the rotating shaft rotates to drive rotation of the linkage rod, the connecting member slides in the assembled groove, such that the linkage rod drives the limiting slider to move in a direction perpendicular to the axis.

In an embodiment of the present invention, the assembled groove of the bracket extends along a direction perpendicular to the axis. The assembled groove limits sliding movement of the limiting element in the direction.

In an embodiment of the present invention, the connecting member is a connecting portion of the second side of the linkage rod, and the connecting portion is assembled on the limiting slider and the bracket.

In an embodiment of the present invention, the limiting slider further has a limiting groove. The bracket further has an assembled groove. The connecting portion of the linkage rod passes sequentially through the limiting groove and the assembled groove. When the rotating shaft rotates to drive rotation of the linkage rod, the connecting portion slides in the assembled groove, such that the linkage rod drives the limiting slider to move in a direction perpendicular to the axis.

In an embodiment of the present invention, one of the first slide groove and the second slide groove is a linear slide groove, and the other one of the first slide groove and the second slide groove is a curved slide groove or an inclined slide groove, so as to limit a moving direction of the cover.

In an embodiment of the present invention, the cover is integrally formed and connected to the first body.

An electronic device includes a first body, a second body, and a pivoting mechanism. The pivoting mechanism is pivotally connected to the first body and the second body to allow rotation of the first body relative to the second body, the pivoting mechanism includes a rotating shaft, a linkage rod, a cover, a limiting element, a limiting slider, a limiting ring, and a bracket. The rotating shaft is disposed in the second body and has an axis. The linkage rod has a first side and a second side that are opposite to each other. The first side has a pivoting portion pivotally connected to the rotating shaft. The pivoting portion has a central region deviating from the axis of the rotating shaft. The cover is disposed between the first body and the second body. The limiting element is assembled to the cover and having a protruding portion. The limiting slider has a first slide groove. The limiting ring is disposed between the rotating shaft and the linkage rod. The pivoting portion of the linkage rod and an end of the rotating shaft are assembled in the limiting ring. The bracket is fixed to the second body and has a second slide groove. The limiting slider is disposed between the limiting element and the bracket. The protruding portion of the limiting element passes through the first slide groove and the second slide groove. The second side of the linkage rod is connected to the limiting slider and the bracket. A shape of the first slide groove is different from a shape of the second slide groove. When the first body rotates relative to the second body, the rotating shaft rotates, the limiting slider is driven via the linkage rod, so as to drive the protruding portion of the limiting element sliding in the first slide groove and the second slide groove, such that the cover is movable between an deployed position and a closed position for covering a gap between the second body and the pivoting mechanism.

In an embodiment of the present invention, when the limiting ring is rotated via the rotating shaft, a rotational displacement of the limiting ring limits a rotational displacement of the linkage rod.

In an embodiment of the present invention, the cover includes a plate and a fixing seat that is fixed on the plate. The limiting element is assembled to the fixing seat.

In an embodiment of the present invention, the fixing seat has a first engaging portion. The limiting element has a second engaging portion engaging the first engaging portion, such that the limiting element is assembled to the fixing seat.

In an embodiment of the present invention, the protruding portion of the limiting element extends along a first direction. The first slide groove of the limiting slider extends along a second direction. The first direction is perpendicular to the second direction. The first slide groove limits sliding movement of the protruding portion of the limiting element in the second direction.

In an embodiment of the present invention, the pivoting mechanism further includes a connecting member. The second side of the linkage rod is assembled to the limiting slider and the bracket via the connecting member.

In an embodiment of the present invention, the limiting slider further has a limiting groove. The bracket further has an assembled groove. The second side of the linkage rod has an assembled hole. The connecting member passes sequentially through the assembled groove, the limiting groove and the assembled hole. When the rotating shaft rotates to drive rotation of the linkage rod, the connecting member slides in the assembled groove, such that the linkage rod drives the limiting slider to move in a direction perpendicular to the axis.

In an embodiment of the present invention, the assembled groove of the bracket extends along a direction perpendicular to the axis. The assembled groove limits sliding movement of the limiting element in the direction.

In an embodiment of the present invention, the second side of the linkage rod has a connecting portion assembled on the limiting slider and the bracket.

In an embodiment of the present invention, the limiting slider further has a limiting groove. The bracket further has an assembled groove. The connecting portion of the linkage rod passes sequentially through the limiting groove and the assembled groove. When the rotating shaft rotates to drive rotation of the linkage rod, the connecting portion slides in the assembled groove, such that the linkage rod drives the limiting slider to move in a direction perpendicular to the axis.

In an embodiment of the present invention, the limiting element of the pivoting mechanism further has an extension portion and an assembled portion. The assembled portion is assembled to the cover and is disposed between the extension portion and the protruding portion. The assembled portion is connected to the extension portion and the protruding portion. An extending direction of the extension portion is parallel to that of the protruding portion.

In an embodiment of the present invention, the pivoting mechanism further includes an auxiliary linkage rod and an auxiliary bracket. The auxiliary linkage rod has a first auxiliary side and a second auxiliary side that are opposite to each other. The first auxiliary side has an auxiliary pivoting portion. The second auxiliary side has a first auxiliary hole. The extension portion of the limiting element is assembled inside the first auxiliary hole. The auxiliary bracket is disposed between the auxiliary linkage rod and the limiting slider and has a second auxiliary hole. The auxiliary pivoting portion of the auxiliary linkage rod is assembled inside the second auxiliary hole.

In an embodiment of the present invention, the second body includes a rotatable heat-dissipating cover. The auxiliary bracket is fixedly connected to the rotatable heat-dissipating cover. When the first body rotates relative to the second body, the rotating shaft rotates and drives the linkage rod to link the limiting slider and the auxiliary linkage rod, such that the rotatable heat-dissipating cover is pivotable between an opened position and a locked positon.

In an embodiment of the present invention, one of the first slide groove and the second slide groove is a linear slide groove, and the other one of the first slide groove and the second slide groove is a curved slide groove or an inclined slide groove, so as to limit a moving direction of the cover.

In an embodiment of the present invention, the first body is a display module, and the second body is a host module.

In an embodiment of the present invention, the cover is integrally formed and connected to the first body.

Based on the above, since the pivoting mechanism of the present invention includes the cover, during rotation of the rotating shaft, the limiting slider is driven via the rotating shaft, so as to drive the protruding portion of the limiting element sliding in the first slide groove of the limiting slider and the second slide groove of the bracket, such that the cover is movable between the deployed position and the closed position. In this way, the electronic device which applied with the pivoting mechanism of the present invention can link the cover via rotation of the rotating shaft for effectively covering the gap between the pivoting mechanism and the second body. As a result, dust and impurities are reduced and prevented from entering the second body to affect operation of the second body.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
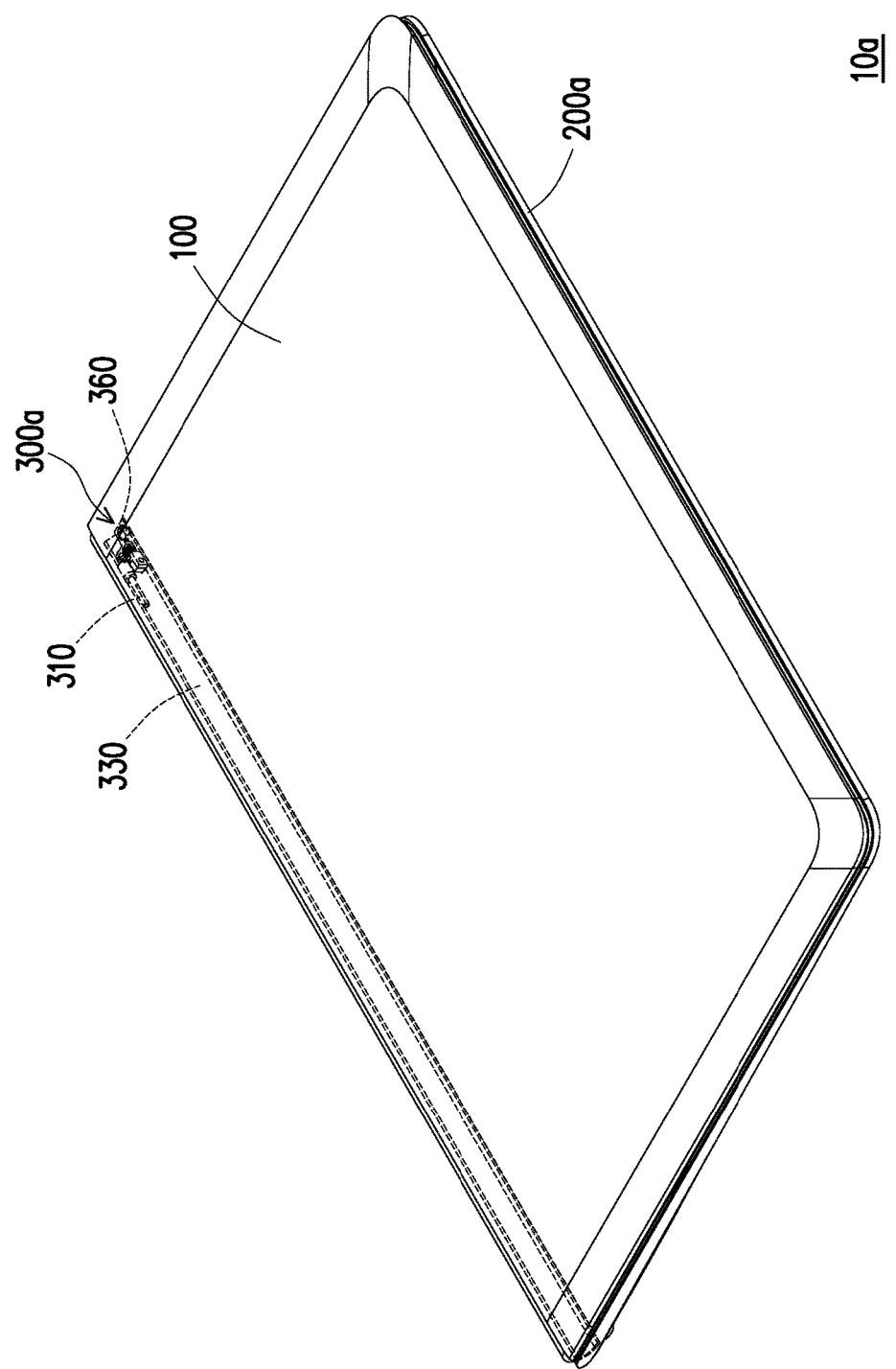
FIG. 1A is a perspective view of an electronic device of an embodiment of the present invention.
Figure 1B:
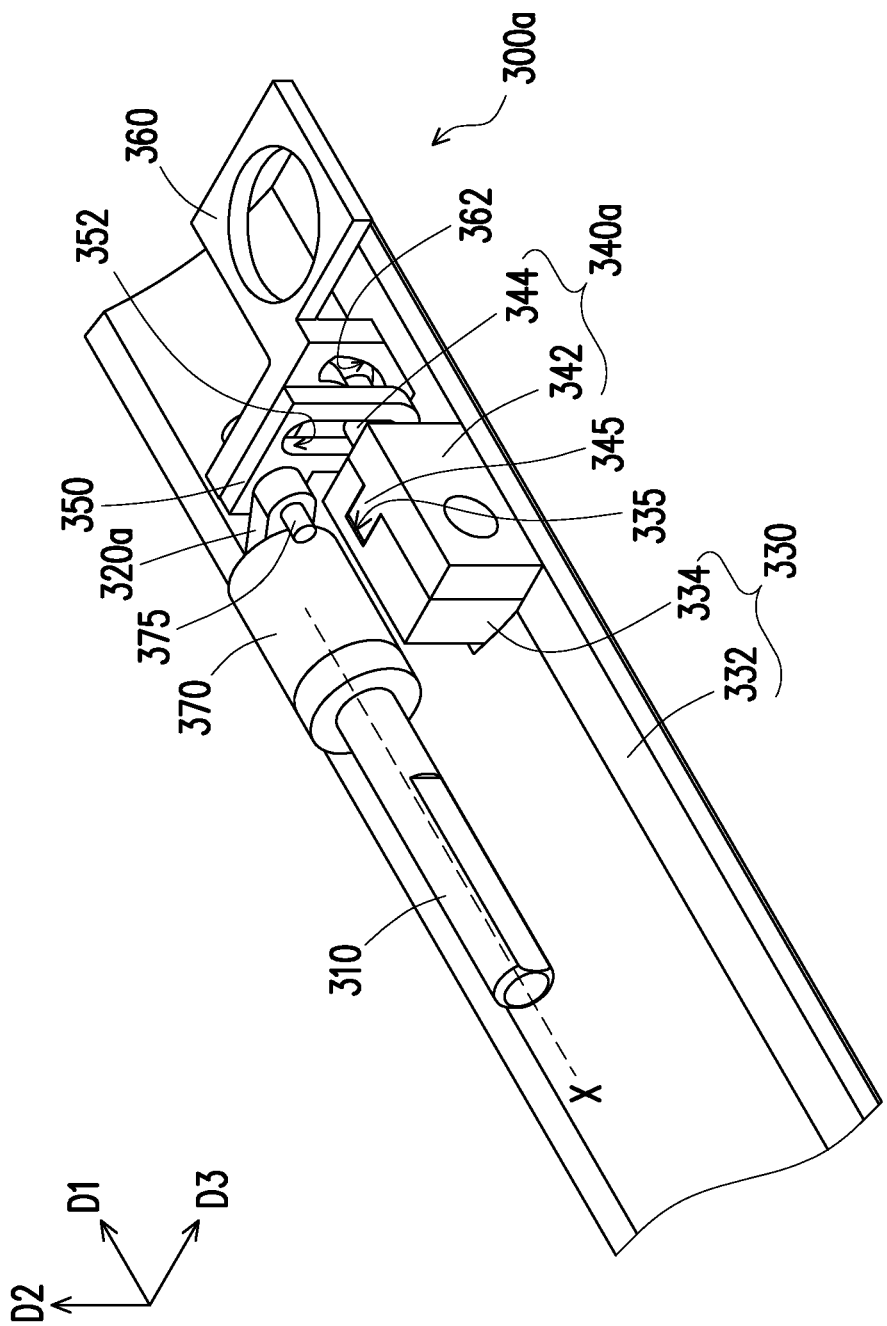
FIG. 1B is a perspective view of a pivoting mechanism of FIG. 1A.
Figure 1C:
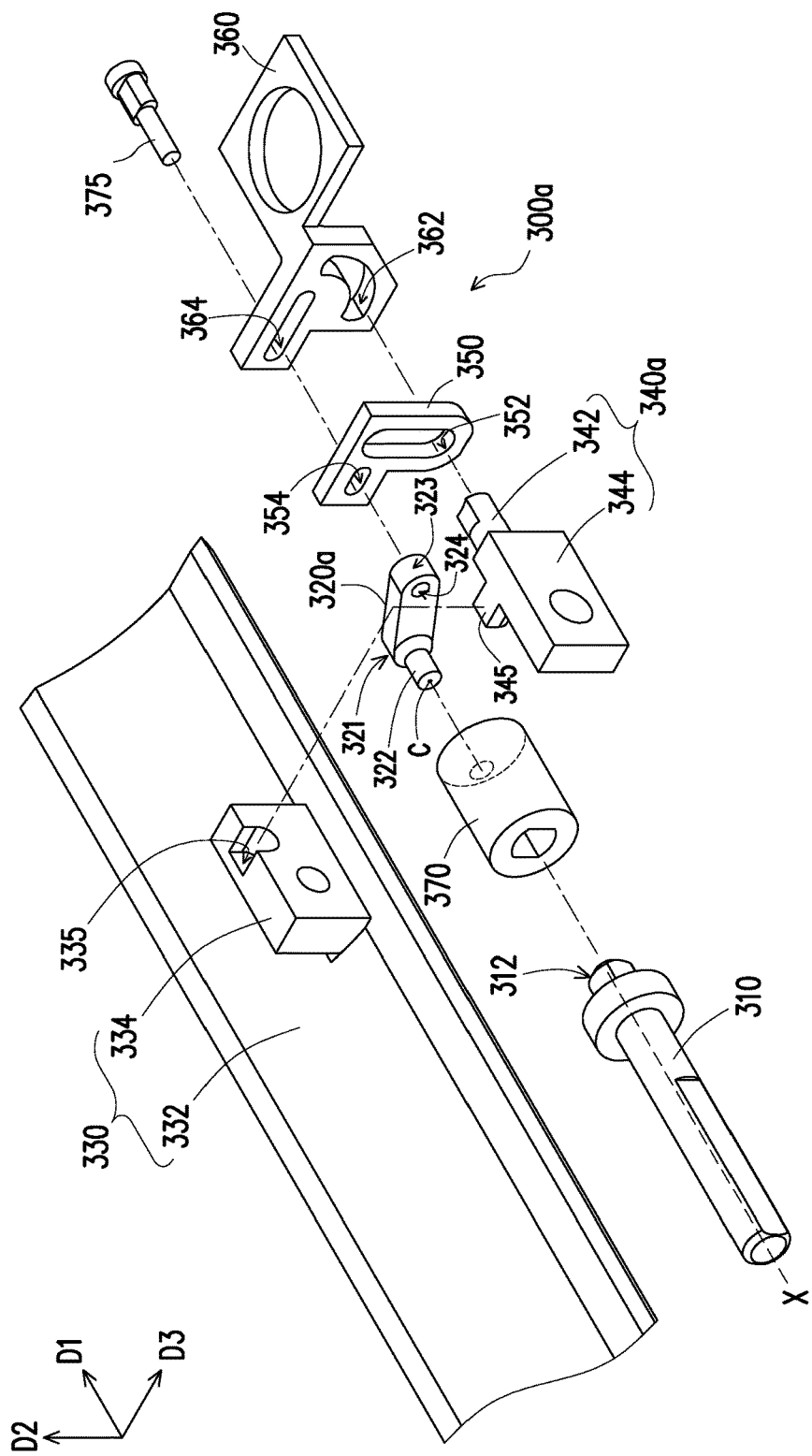
FIG. 1C is an exploded perspective view of the pivoting mechanism of FIG. 1B.

FIG. 1A is a perspective view of an electronic device of an embodiment of the present invention. FIG. 1B is a perspective view of a pivoting mechanism of FIG. 1A. FIG. 1C is an exploded perspective view of the pivoting mechanism of FIG. 1B. First referring to FIG. 1A, in this embodiment, an electronic device 10a includes a first body 100, a second body 200a, and at least one pivoting mechanism 300a. The pivoting mechanism 300a is pivotally connected to the first body 100 and the second body 200a, so as to allow rotation of the first body 100 relative to the second body 200a. Herein, the electronic device 10a is, for example, a notebook computer. The first body 100 is, for example, a display module, and the second body 200a is, for example, a host module, but is not limited thereto.

Referring to FIG. 1A, FIG. 1B, and FIG. 1C simultaneously, the pivoting mechanism 300a in this embodiment includes a rotating shaft 310, a linkage rod 320a, a cover 330, a limiting element 340a, a limiting slider 350, and a bracket 360. The rotating shaft 310 is disposed inside the second body 200a and has an axis X. The linkage rod 320a has a first side 321 and a second side 323 that are opposite to each other. The first side 321 of the linkage rod 320a has a pivoting portion 322 pivotally connected to the rotating shaft 310. A central region C deviates from an axis X of the rotating shaft 310. In other words, in this embodiment, the linkage rod 320a is substantially an eccentric linkage rod. An extending direction of the pivoting portion 322 of the linkage rod 320a is substantially parallel to the axis X of the rotating shaft 310.

In this embodiment, the pivoting mechanism 300a may further includes a limiting ring 370 disposed between the rotating shaft 310 and the linkage rod 320a. The pivoting portion 322 of the linkage rod 320a and an end 312 of the rotating shaft 310 are assembled inside the limiting ring 370. Herein, a rotational displacement of the limiting ring 370 is controlled via an eccentric position of the pivoting portion 322 of the linkage rod 320a. Therefore, when the rotating shaft 310 rotates to drive the limiting ring 370, the rotational displacement of the limiting ring 370 limits a rotational displacement of the linkage rod 320a. On the other hand, the second side 323 of the linkage rod 320a is connected to the limiting slider 350 and the bracket 360.

The cover 330 is disposed between the first body 100 and the second body 200a, and is disposed below the rotating shaft 310. The cover 330 includes a plate 332 and a fixing seat 334. In one embodiment, the cover 330 may be integrally formed and connected to the first body 110. The limiting element 340a includes a protruding portion 342 and an assembled portion 344. The fixing seat 334 of the cover 330 is fixedly disposed on the plate 332. The assembled portion 344 of the limiting element 340a is assembled to the fixing seat 334. Furthermore, the fixing seat 334 of the cover 330 has a first engaging portion 335, and the assembled portion 344 of the limiting element 340a has a second engaging portion 345 engaging the first engaging portion 335, such that the assembled portion 344 of the limiting element 340a is assembled to the fixing seat 334 of the cover 330. Herein, the first engaging portion 335 is configured as an engaging groove, and the second engaging portion 345 is configured as a protrusion, but those are not limited thereto. In other embodiments not shown, the first engaging portion may be a protrusion, and the second engaging portion may be an engaging groove, which is still within the scope of the present invention.

The limiting slider 350 is disposed between the limiting element 340a and the bracket 360, and includes a first slide groove 352. The limiting slider 350 is movably connected to the linkage rod 320a and the limiting element 340. As shown in FIG. 1C, in this embodiment, the first slide groove 352 is configured as a linear slide groove. The protruding portion 342 of the limiting element 340a extends along a first direction D1, and the first slide groove 352 of the limiting slider 350 extends along a second direction D2 perpendicular to the first direction D1. Particularly, the first slide groove 352 of the limiting slider 350 may limit displacement (i.e., displacement of upward and downward sliding movement) of the protruding portion 342 of the limiting element 340a in the second direction D2.

The bracket 360 is fixed inside the second body 200a, and has a second slide groove 362. As shown in FIG. 1C, the second slide groove 362 is configured as a curved slide groove, that is, a shape of the first slide groove 352 of the limiting slider 350 is different from a shape of the second slide groove 362 of the bracket 360. In one embodiment, an overlapping region of the first slide groove 352 and the second slide groove 362 defines a limiting hole to let the protruding portion 342 of the limiting element 340a pass through, which facilitates security during rotation of the cover 330. The protruding portion 342 of the limiting element 340a passes through the first slide groove 352 of the limiting slider 350 and the second slide groove 362 of the bracket 360, so as to be located inside the first slide groove 352 and the second slide groove 362. The shape of the second slide groove 362 of the bracket 360 may limit a rotational angle of the cover 330.

Of course, this embodiment is not limited to the configured shape of the first slide groove 352 and the second slide groove 362. In other embodiments, the first slide groove and the second slide groove may be a combination of the linear slide groove and an inclined slide groove, as long as the shape of the first slide groove is different from that of the second slide groove, which still belongs to the scope of the present invention.

In addition, in this embodiment, the limiting slider 350 further has a limiting groove 354. The bracket 360 further has an assembled groove 364. The second side 323 of the linkage rod 320a has an assembled hole 324. The second side 323 of the linkage rod 320a is connected to the limiting slider 350 and the bracket 360 via a connecting member 375. The connecting member 375 passes sequentially through the assembled groove 364 of the bracket 360, the limiting groove 354 of the limiting slider 350, and the assembled hole 324 of the linkage rod 320a, so as to assemble the second side 323 of the linkage rod 320a to the limiting slider 350 and the bracket 360. Herein, the assembled groove 364 of the bracket 360 extends along a direction (i.e., a third direction D3) perpendicular to the axis X of the rotating shaft 310. The assembled groove 364 of the bracket 360 is configured as a linear slide groove, and is substantially perpendicular to the first slide groove 352 of the limiting slider 350. Particularly, the assembled groove 364 of the bracket 360 may limit displacement (i.e., leftward and rightward displacement) of the limiting element 340a in the third direction D3. In another embodiment, an end of the connecting member 375 may be disposed on the second side 323 of the linkage rod 320a and formed integrally and connected to the linkage rod, and the other end of the connecting member 375 passes through the assembled groove 364 of the bracket 360 and the limiting groove 354 of the limiting slider 350.

Figure 1D:
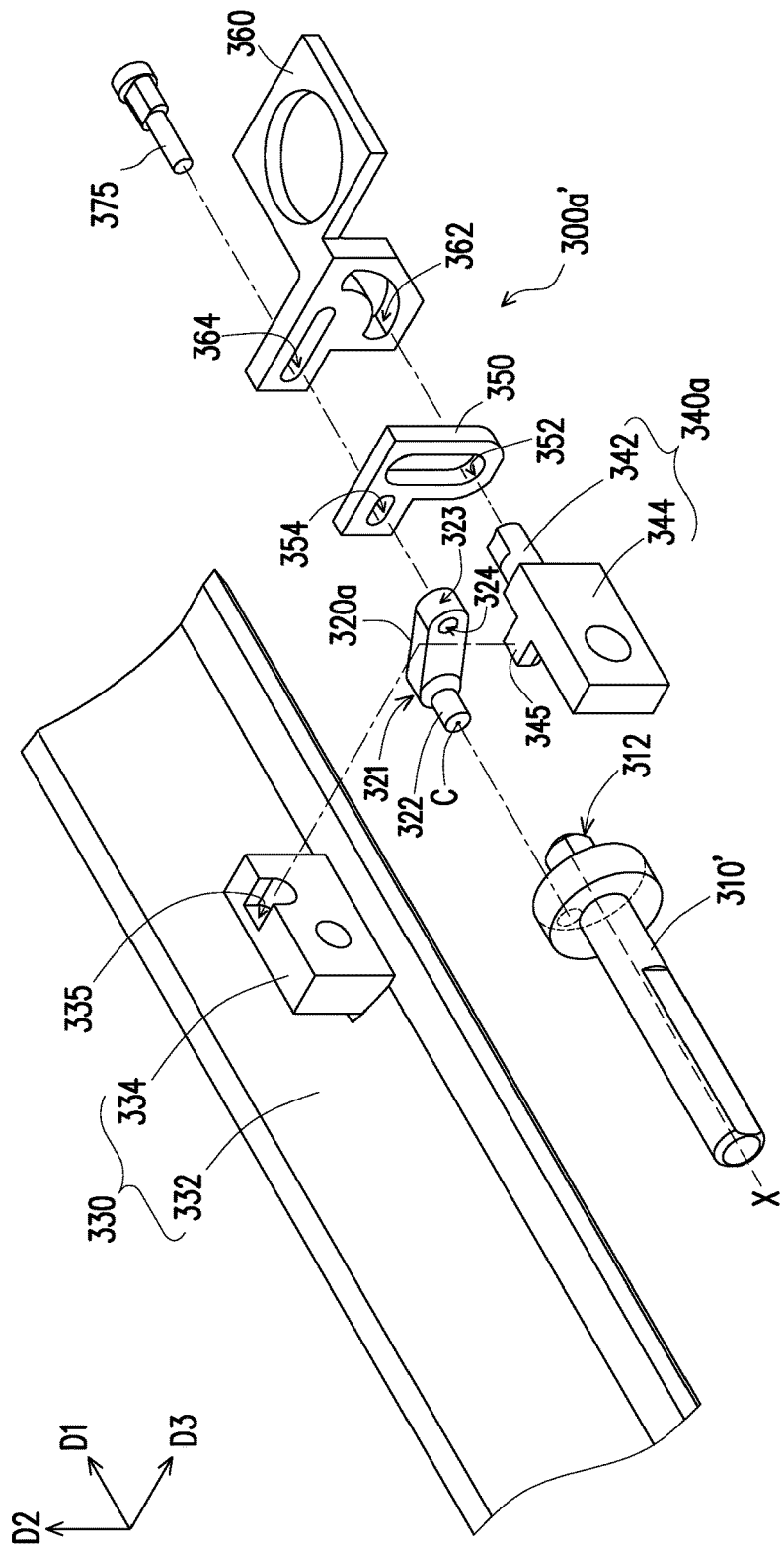
FIG. 1D is a perspective view of a pivoting mechanism of another embodiment of the present invention.

It should be noted that, in another embodiment, referring to FIG. 1D, the pivoting mechanism 300a' may exclude the limiting ring 370 shown in FIG. 1C, and the pivoting portion 322 of the linkage rod 320a is directly pivotally connected to the rotating axis 310'. This still belongs to the scope of the present invention.

Figure 2A:
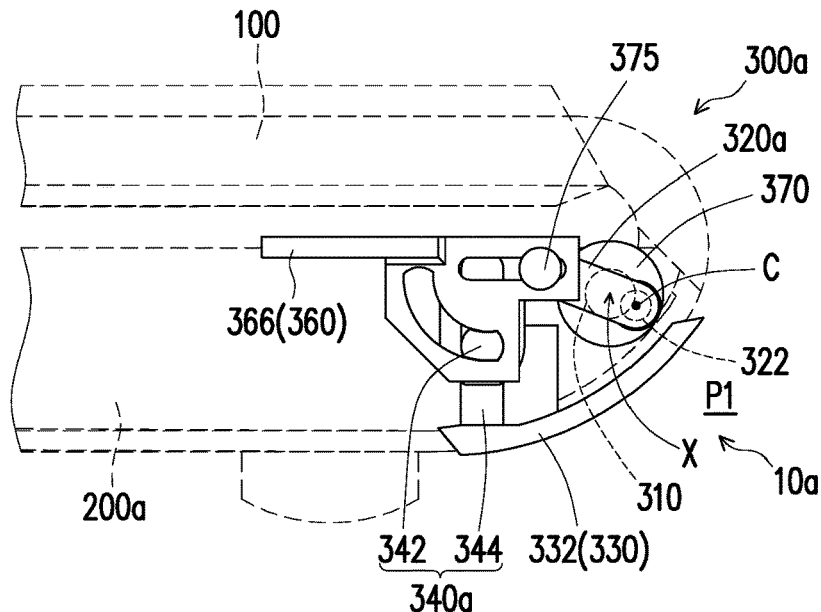
FIG. 2A to FIG. 2C are schematic views illustrating actuations of the pivoting mechanism of FIG. 1A from a closed position to a deployed position.
Figure 2B:
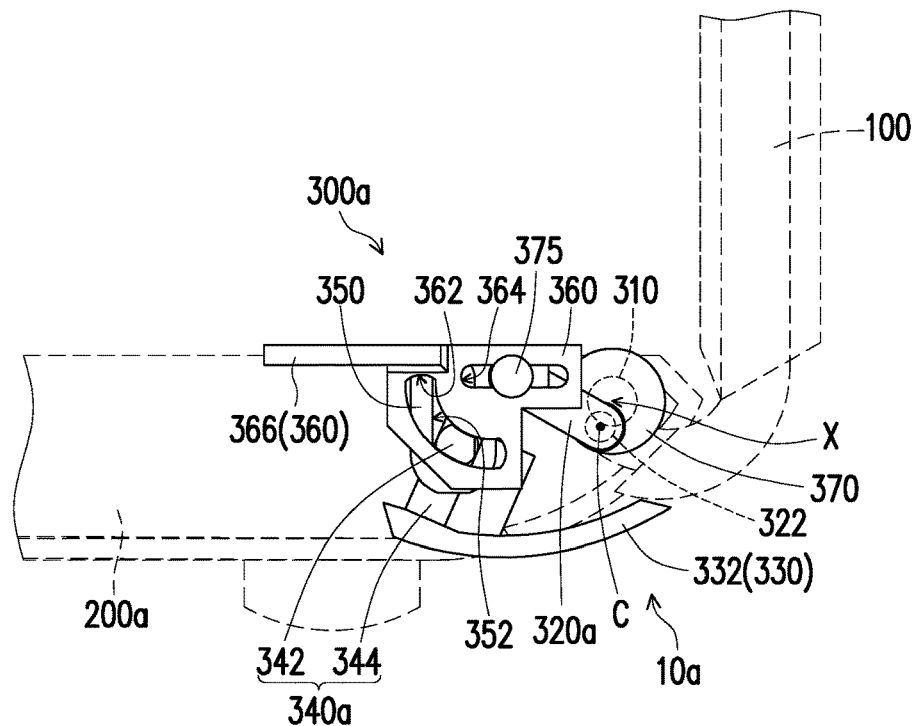
Figure 2C:
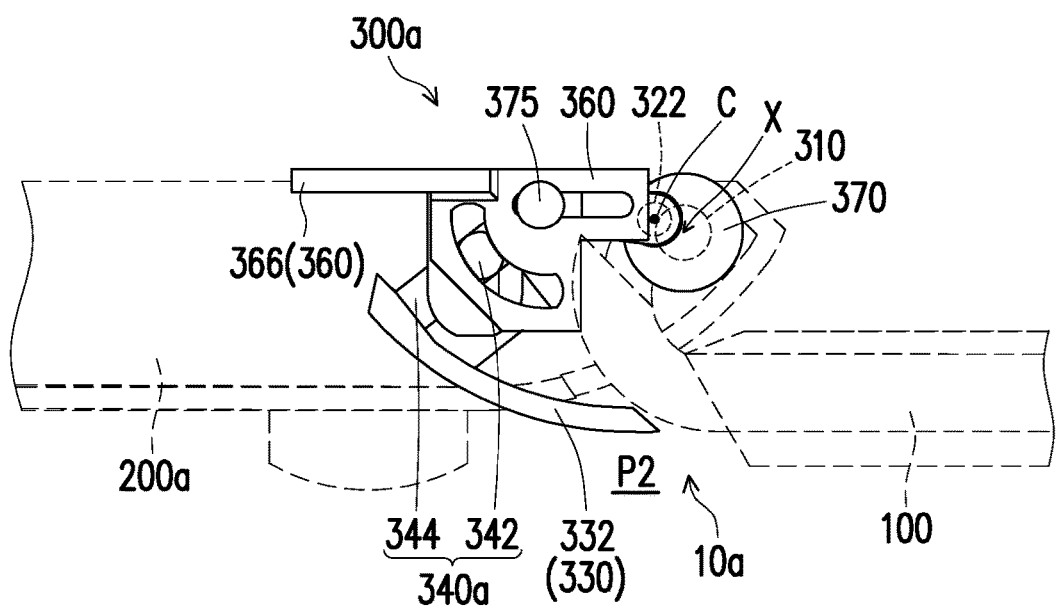

Actuation way of the pivoting mechanism 300a of the electronic device 10a will be described in detail as follows. FIG. 2A to FIG. 2C are schematic views illustrating actuations of the pivoting mechanism of FIG. 1A from a closed position to a deployed position. For convenience in explanation, in FIG. 2A, FIG. 2B, and FIG. 2C, the first body 100 and the second body 200a of the electronic device 10a is indicated by broken lines, and the pivoting mechanism 300a is indicated by solid lines.

Referring to FIG. 2A, when the first body 100 and the second body 200a are in an overlapping state, that is, a rotational angel of the first body 100a relative to the second body 200a is 0 degree, the plate 332 of the cover 330 of the pivoting mechanism 300a is located in a closed position P1, and the plate 332 of the cover 330 covers a gap between the second body 200a and the pivoting mechanism 300a. As shown in FIG. 2A, a fixing portion 366 of the bracket 360 of the pivoting mechanism 300a is fixedly disposed in the second body 200a. The central region C of the pivoting portion 322 of the linkage rod 320a deviates from the axis X of the rotational shaft 310. Locations of the protruding portion 342 of the limiting element 340 and the connecting member 375 are relatively away from the fixing portion 366 of the bracket 360.

Then, referring to FIG. 1B and FIG. 2B simultaneously, when the first body 100 rotates 90 degrees relative to the second body 200a, the rotating shaft 310 rotates to drive rotation of the linkage rod 320a, the connecting member 375 slides in the assembled groove 364 of the bracket 360, and the linkage rod 320a drives the limiting slider 350 to move in the third direction D3 perpendicular to the axis X. At this time, the protruding portion 342 of the limiting element 340a slides in the first slide groove 352 of the limiting slider 350 and the second slide groove 362 of the bracket 360. That is, after rotation of the rotating shaft 310, the linkage rod 320a is driven, and the limiting slider 350 is moved adjacent to the fixing portion 366 of the bracket 360. The protruding portion 342 of the limiting element 340a generates a displacement due to limitation of the first slide groove 352 of the limiting slider 350 and the second slide groove 362 of the bracket 360. At this time, the plate 332 of the cover 330 covers the gap between the second body 200a and the pivoting mechanism 300a.

Finally, referring to FIG. 2C, when the first body 100 rotates 180 degrees relative to the second body 200a, the cover 330 is located in a deployed position P2, and the plate 332 of the cover 330 covers the gap between the second body 200a and the pivoting mechanism 300a. At this time, as shown in FIG. 2C, the locations of the protruding portion 342 of the limiting element 340a and the connecting member 375 are relatively adjacent to the fixing portion 366 of the bracket 360.

When the first body 100 rotates relative to the second body 200a, the rotating shaft 310 rotates. Via the linkage rod 320a, the limiting slider 350 is driven to move in the third direction D3 perpendicular to the axis X, so as to drive the protruding portion 342 of the limiting element 340a sliding in the first slide groove 352 and the second slide groove 362, such that the cover 330 moves between the closed position P1 and the deployed position P2, and that the gap between the second body 200a and the pivoting mechanism 300a is covered. Briefly, during open process of the first body 100 of the electronic device 10a relative to the second body 200a, the pivoting mechanism 300a is synchronously displaced, thus the appearance of the second body 200a can be prevented from being directly opened.

It should be noted that the embodiments provided below use the reference numerals and part of the content of the embodiment above, where the same or similar elements are represented by using the same reference numerals and the description related to the same technical content is omitted. The description related to the omitted part may refer to that of the embodiment above and will not be repeated hereinafter.

Figure 3A:
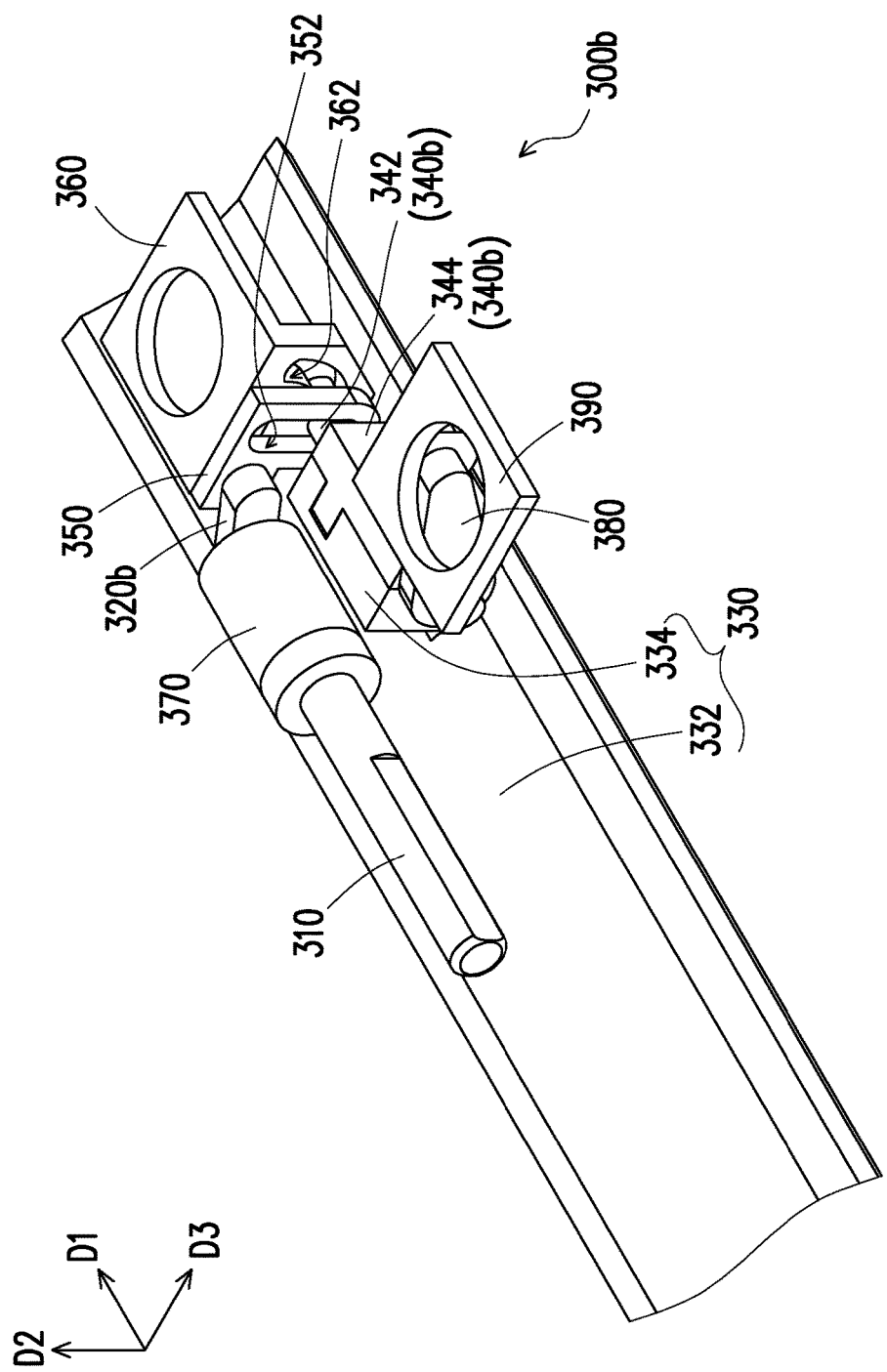
FIG. 3A is a perspective view of a pivoting mechanism of another embodiment of the present invention.
Figure 3B:
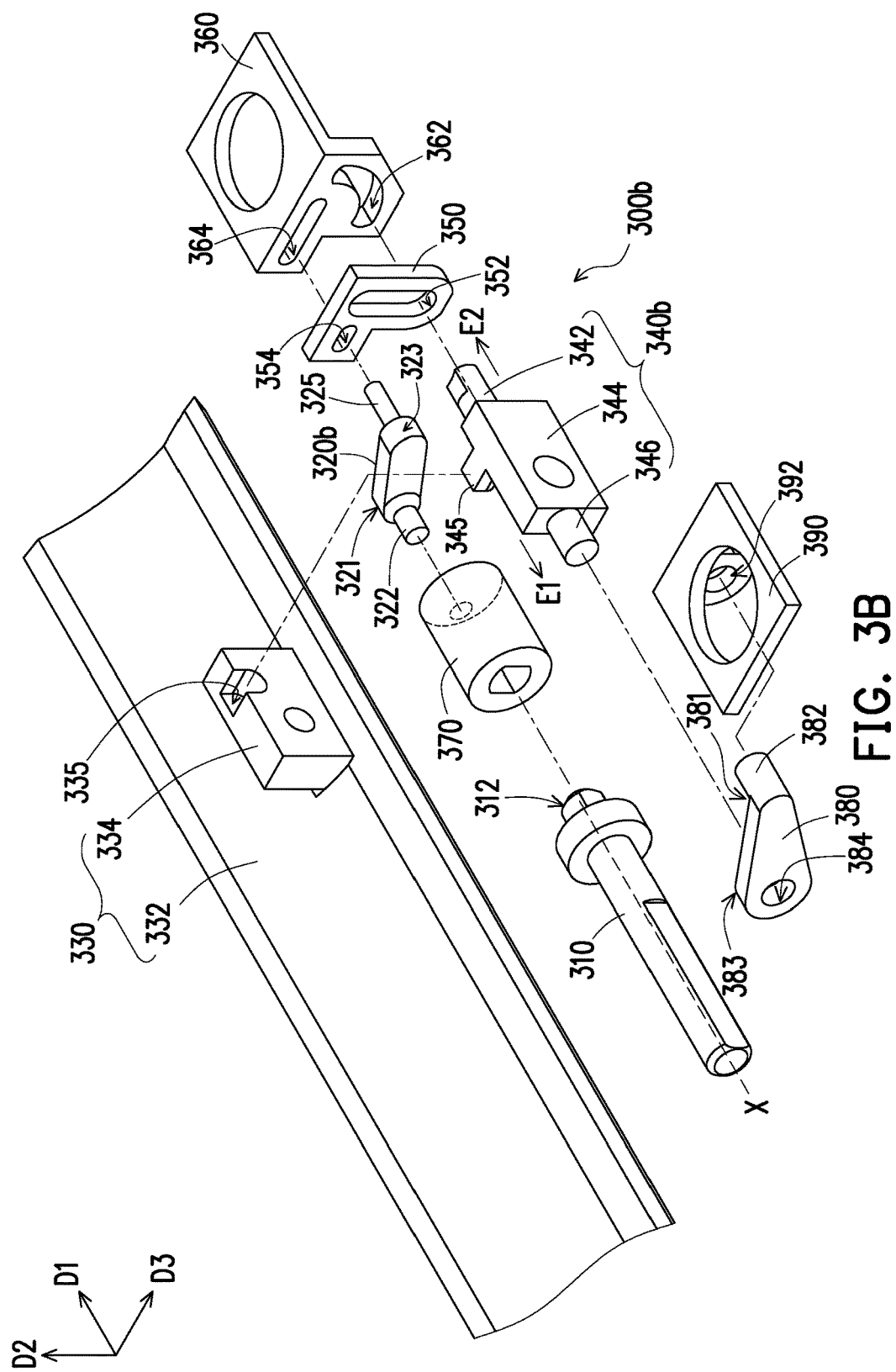
FIG. 3B is an exploded perspective view of the pivoting mechanism of FIG. 3A.

FIG. 3A is a perspective view of a pivoting mechanism of another embodiment of the present invention. FIG. 3B is an exploded perspective view of the pivoting mechanism of FIG. 3A. referring to FIG. 1C and FIG. 2B simultaneously, the pivoting mechanism 300b of this embodiment is similar to the pivoting mechanism 300a in FIG. 1C, difference therebetween lies in: the pivoting mechanism 300b of this embodiment uses a connecting portion 325 of the second side 323 of the linkage rod 320b to replace the connecting member 375 of the previous embodiment. Specifically, in this embodiment, the second side 323 of the linkage rod 320b has the connecting portion 325, which passes substantially through the limiting groove 354 of the limiting slider 350 and the assembled groove 364 of the bracket 360 to be assembled to the limiting slider 350 and the bracket 360. When the rotating shaft 310 rotates to drive rotation of the linkage rod 320b, the connecting portion 325 can slide in the assembled groove 364 of the bracket 360, such that the linkage rod 320b drives the limiting slider 350 to move in the third direction D3 perpendicular to the axis X.

Moreover, in this embodiment, the limiting element 340b of the pivoting mechanism 300b further has an extension portion 346. The assembled portion 344 is located between the extension portion 346 and the protruding portion 342, and the assembled portion 344 is connected to the extension portion 346 and the protruding portion 342. Herein, an extending direction E1 of the extension portion 346 is parallel to an extending direction E2 of the protruding portion 342.

Besides, in this embodiment, the pivoting mechanism 300b further includes am auxiliary linkage rod 380 and an auxiliary bracket 390. The auxiliary linkage rod 380 has a first auxiliary side 381 and a second auxiliary side 383 opposite to each other. The first auxiliary side 381 has an auxiliary pivoting portion 382. The second auxiliary side 383 has a first auxiliary hole 384. The extension portion 346 of the limiting element 340b is assembled in the first auxiliary hole 384. The auxiliary bracket 390 is located between the auxiliary linkage rod 380 and the limiting slider 350, and has a second auxiliary hole 392. The auxiliary pivoting portion 382 of the auxiliary linkage rod 380 is assembled in the second auxiliary hole 392.

Figure 4A:
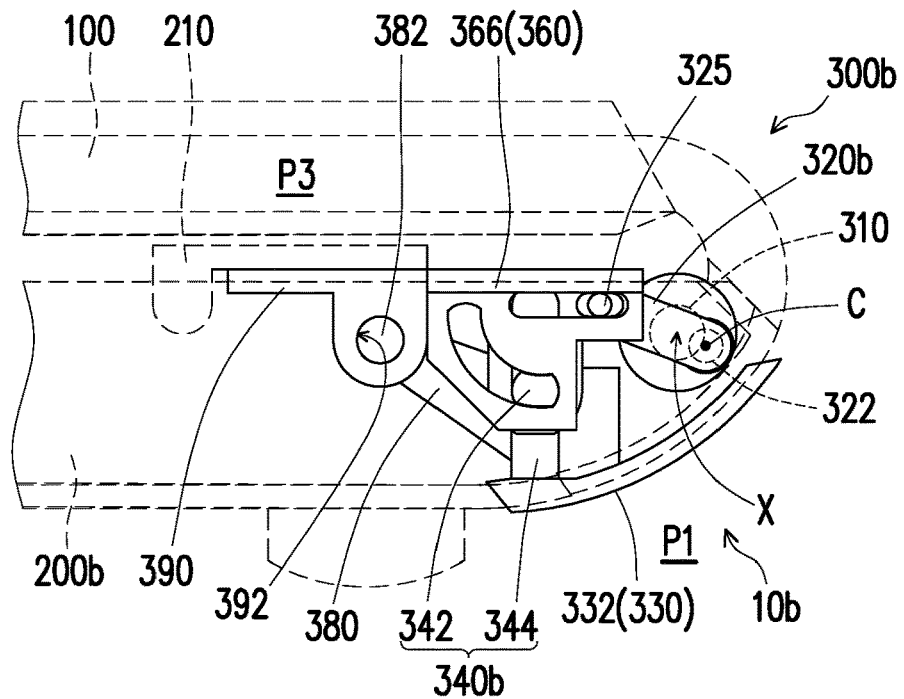
FIG. 4A to FIG. 4C are schematic views illustrating actuations of the pivoting mechanism of FIG. 3A from a closed position to a deployed position.
Figure 4B:
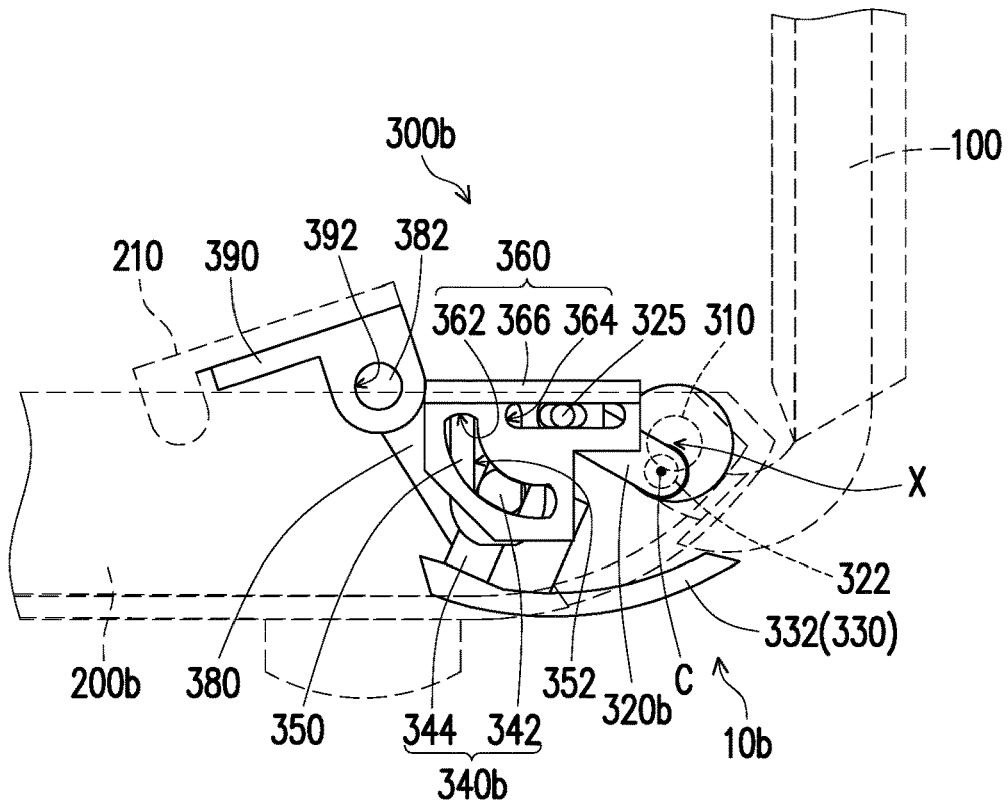
Figure 4C:
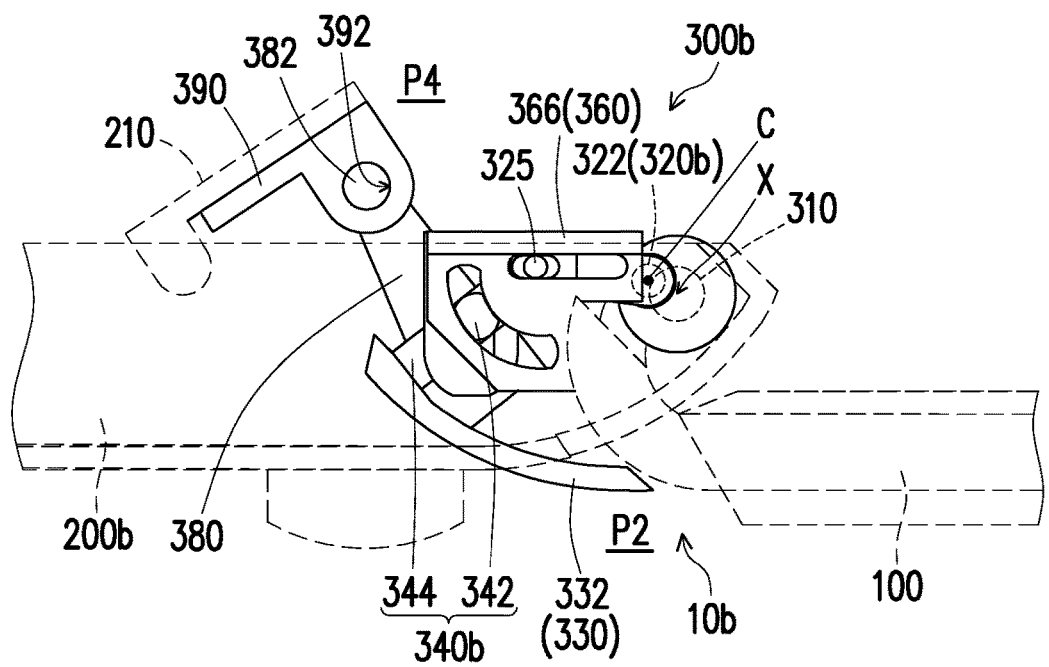

FIG. 4A to FIG. 4C are schematic views illustrating actuations of the pivoting mechanism of FIG. 3A from a closed position to a deployed position. Actuation way of the pivoting mechanism 300b of the electronic device 10b will be described in detail as follows. For convenience in explanation, in FIG. 4A, FIG. 4B, and FIG. 4C, the first body 100 and the second body 200b of the electronic device 10b is indicated by broken lines, and the pivoting mechanism 300b is indicated by solid lines.

Referring to FIG. 4A, in this embodiment, the second body 200b of the electronic device 10b includes a rotatable heat-dissipating cover 210. The auxiliary bracket 390 is fixedly connected to the rotatable heat-dissipating cover 210. When the first body 100 and the second body 200b are in the overlapping state, that is, a rotational angel of the first body 100 relative to the second body 200b is 0 degree, the plate 332 of the cover 330 of the pivoting mechanism 300b is located in the closed position P1, and the rotatable heat-dissipating cover 210 is located in a locked position P3. At this time, the plate 332 of the cover 330 covers the gap between the second body 200b and the pivoting mechanism 300b. The rotatable heat-dissipating cover 210 is substantially parallel arranged with the fixing portion 366 of the bracket 360. As shown in FIG. 4A, the fixing portion 366 of the bracket 360 of the pivoting mechanism 300b is fixedly disposed in the second body 200b. The central region C of the pivoting portion 322 of the linkage rod 320b deviates from the axis X of the rotational shaft 310. The locations of the protruding portion 342 of the limiting element 340 and the connecting member 325 of the linkage rod 320b are relatively away from the rotatable heat-dissipating cover 210.

Then, referring to FIG. 3B and FIG. 4B simultaneously, when the first body 100 rotates 90 degrees relative to the second body 200b, the rotating shaft 310 rotates to drive rotation of the linkage rod 320b, the connecting portion 325 of the linkage rod 320b slides in the assembled groove 364 of the bracket 360. On the other hand, the linkage rod 320b drives the limiting slider 350 to move in the third direction D3 perpendicular to the axis X. Simultaneously, the linkage rod 320b also drives the auxiliary linkage rod 380, so that the rotatable heat-dissipating cover 210 gradually lifts away from a surface of the fixing portion 366 of the bracket 360. As shown in FIG. 4B, the protruding portion 342 of the limiting element 340b slides in the first slide groove 352 of the limiting slider 350 and the second slide groove 362 of the bracket 360. In other words, after rotation of the rotating shaft 310, the linkage rod 320b is driven, and the limiting slider 350 is moved adjacent to the fixing portion 366 of the bracket 360. The protruding portion 342 of the limiting element 340b generates a displacement due to limitation of the first slide groove 352 of the limiting slider 350 and the second slide groove 362 of the bracket 360. At this time, the plate 332 of the cover 330 covers the gap between the second body 200b and the pivoting mechanism 300b.

Finally, referring to FIG. 4C, when the first body 100 rotates 180 degrees relative to the second body 200b, the cover 330 is located in the deployed position P2, and the rotatable heat-dissipating cover 210 is located in a opened position P4. At this time, the plate 332 of the cover 330 covers the gap between the second body 200b and the pivoting mechanism 300b, and the rotatable heat-dissipating cover 210 is opened relative to the second body 200b to dissipate contents in the second body 200b. As shown in FIG. 4C, the locations of the protruding portion 342 of the limiting element 340b and the connecting portion 325 of the linkage rod 320b are relatively adjacent to the fixing portion 366 of the bracket 360.

Briefly, when the first body 100 rotates relative to the second body 200b, the rotating shaft 310 rotates. The limiting slider 350 and the auxiliary linkage rod 380 are driven via the linkage rod 320b to make the cover 330 displaces (moves) simultaneously. The rotatable heat-dissipating cover 210 pivots between the locked position P3 and the opened position P4 for dissipation interior of the second body 200b.

Based on the above, since the pivoting mechanism of the present invention includes the cover, during rotation of the rotating shaft, the limiting slider is driven via the rotating shaft, so as to drive the protruding portion of the limiting element sliding in the first slide groove of the limiting slider and the second slide groove of the bracket, such that the cover is movable between the deployed position and the closed position. In this way, the electronic device which applied with the pivoting mechanism of the present invention can link the cover via rotation of the rotating shaft for effectively covering the gap between the pivoting mechanism and the second body. As a result, dust and impurities are reduced and prevented from entering the second body to affect operation of the second body.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pivoting mechanism, pivotally connected to a first body and a second body to allow rotation of the first body relative to the second body, the pivoting mechanism comprising:
   a rotating shaft, having an axis;
   a linkage rod, having a first side and a second side that are opposite to each other, the first side having a pivoting portion that is pivotally connected to the rotating shaft, and a central region of the pivoting portion deviating from the axis of the rotating shaft;
   a cover, disposed between the first body and the second body;
   a limiting element, assembled to the cover and comprising a protruding portion;
   a limiting slider, comprising a first slide groove; and a bracket, fixed to the second body, and comprising a second slide groove, wherein the limiting slider is disposed between the limiting element and the bracket, the protruding portion of the limiting element passes through the first slide groove and the second slide groove, the second side of the linkage rod is connected to the limiting slider and the bracket via a connecting member, a shape of the first slide groove is different from a shape of the second slide groove, when the rotating shaft rotates, the limiting slider is driven via the linkage rod, so as to drive the protruding portion of the limiting element sliding in the first slide groove and the second slide groove, such that the cover is movable between a deployed position and a closed position.

2. The pivoting mechanism according to claim 1, further comprising:
a limiting ring, disposed between the rotating shaft and the linkage rod, the pivoting portion of the linkage rod and an end of the rotating shaft being assembled to the limiting ring, wherein when the limiting ring is rotated via the rotating shaft, a rotational displacement of the limiting ring limits a rotational displacement of the linkage rod.

3. The pivoting mechanism according to claim 1, wherein the cover comprises a plate and a fixing seat that is fixed on the plate, and the limiting element is assembled to the fixing seat.

4. The pivoting mechanism according to claim 3, wherein the fixing seat has a first engaging portion, the limiting element has a second engaging portion engaging the first engaging portion, such that the limiting element is assembled to the fixing seat.

5. The pivoting mechanism according to claim 1, wherein the protruding portion of the limiting element extends along a first direction, the first slide groove of the limiting slider extends along a second direction, the first direction is perpendicular to the second direction, and the first slide groove limits sliding movement of the protruding portion of the limiting element in the second direction.

6. The pivoting mechanism according to claim 1, wherein the connecting member passes through the bracket, the limiting slider, and the second side of the linkage rod, so as to be assembled to the limiting slider and the bracket.

7. The pivoting mechanism according to claim 1, wherein the limiting slider further comprises a limiting groove, the bracket further comprises an assembled groove, the second side of the linkage rod has an assembled hole, the connecting member passes sequentially through the assembled groove, the limiting groove, and the assembled hole, when the rotating shaft rotates to drive rotation of the linkage rod, the connecting member slides in the assembled groove, such that the linkage rod drives the limiting slider to move in a direction perpendicular to the axis.

8. The pivoting mechanism according to claim 7, wherein the assembled groove of the bracket extends along a direction perpendicular to the axis, and the assembled groove limits sliding movement of the limiting element in the direction.

9. The pivoting mechanism according to claim 1, wherein the connecting member is a connecting portion of the second side of the linkage rod, and the connecting portion is assembled on the limiting slider and the bracket.

10. The pivoting mechanism according to claim 9, wherein the limiting slider further comprises a limiting groove, the bracket further comprises an assembled groove, the connecting portion of the linkage rod passes sequentially through the limiting groove and the assembled groove, when the rotating shaft rotates to drive rotation of the linkage rod, the connecting portion slides in the assembled groove, such that the linkage rod drives the limiting slider to move in a direction perpendicular to the axis.

11. The pivoting mechanism according to claim 1, wherein one of the first slide groove and the second slide groove is a linear slide groove, and the other one of the first slide groove and the second slide groove is a curved slide groove or an inclined slide groove, so as to limit a moving direction of the cover.

12. The pivoting mechanism according to claim 1, wherein the cover is integrally formed and connected to the first body.

13. An electronic device, comprising:
a first body;
a second body; and
a pivoting mechanism, pivotally connected to the first body and the second body, so as to allow rotation of the first body relative to the second body, the pivoting mechanism comprising:
a rotating shaft, disposed in the second body and having an axis;
a linkage rod, having a first side and a second side that are opposite to each other, the first side having a pivoting portion that is pivotally connected to the rotating shaft, and the pivoting portion having a central region deviating from the axis of the rotating shaft;
a cover, disposed between the first body and the second body;
a limiting element, assembled to the cover and comprising a protruding portion;
a limiting slider, comprising a first slide groove;
a limiting ring, disposed between the rotating shaft and the linkage rod, the pivoting portion of the linkage rod and an end of the rotating shaft being assembled in the limiting ring; and
a bracket, fixed to the second body and comprising a second slide groove, wherein the limiting slider is disposed between the limiting element and the bracket, the protruding portion of the limiting element passes through the first slide groove and the second slide groove, the second side of the linkage rod is connected to the limiting slider and the bracket, a shape of the first slide groove is different from a shape of the second slide groove, when the first body rotates relative to the second body, the rotating shaft rotates, the limiting slider is driven via the linkage rod, so as to drive the protruding portion of the limiting element sliding in the first slide groove and the second slide groove, such that the cover is movable between an deployed position and a closed position for covering a gap between the second body and the pivoting mechanism.

14. The electronic device according to claim 13, wherein when the limiting ring is rotated via the rotating shaft, a rotational displacement of the limiting ring limits a rotational displacement of the linkage rod.

15. The electronic device according to claim 13, wherein the cover comprises a plate and a fixing seat that is fixed on the plate, and the limiting element is assembled to the fixing seat.

16. The electronic device according to claim 15, wherein the fixing seat has a first engaging portion, the limiting element has a second engaging portion engaging the first engaging portion, such that the limiting element is assembled to the fixing seat.

17. The electronic device according to claim 13, wherein the protruding portion of the limiting element extends along a first direction, the first slide groove of the limiting slider extends along a second direction, the first direction is perpendicular to the second direction, and the first slide groove limits sliding movement of the protruding portion of the limiting element in the second direction.

18. The electronic device according to claim 13, further comprising:
a connecting member, the second side of the linkage rod being assembled to the limiting slider and the bracket via the connecting member.

19. The electronic device according to claim 18, wherein the limiting slider further comprises a limiting groove, the bracket further comprises an assembled groove, the second side of the linkage rod has an assembled hole, the connecting member passes sequentially through the assembled groove, the limiting groove and the assembled hole, when the rotating shaft rotates to drive rotation of the linkage rod, the connecting member slides in the assembled groove, such that the linkage rod drives the limiting slider to move in a direction perpendicular to the axis.

20. The electronic device according to claim 19, wherein the assembled groove of the bracket extends along a direction perpendicular to the axis, and the assembled groove limits sliding movement of the limiting element in the direction.

21. The electronic device according to claim 13, wherein the second side of the linkage rod has a connecting portion assembled on the limiting slider and the bracket.

22. The electronic device according to claim 21, wherein the limiting slider further comprises a limiting groove, the bracket further comprises an assembled groove, the connecting portion of the linkage rod passes sequentially through the limiting groove and the assembled groove, when the rotating shaft rotates to drive rotation of the linkage rod, the connecting portion slides in the assembled groove, such that the linkage rod drives the limiting slider to move in a direction perpendicular to the axis.

23. The electronic device according to claim 13, wherein the limiting element of the pivoting mechanism further comprises an extension portion and an assembled portion, the assembled portion is assembled to the cover and is disposed between the extension portion and the protruding portion, the assembled portion is connected to the extension portion and the protruding portion, and an extending direction of the extension portion is parallel to that of the protruding portion.

24. The electronic device according to claim 23, wherein the pivoting mechanism further comprises:
an auxiliary linkage rod, having a first auxiliary side and a second auxiliary side that are opposite to each other, the first auxiliary side having an auxiliary pivoting portion, the second auxiliary side having a first auxiliary hole, and the extension portion of the limiting element is assembled inside the first auxiliary hole; and
an auxiliary bracket, disposed between the auxiliary linkage rod and the limiting slider and having a second auxiliary hole, and the auxiliary pivoting portion of the auxiliary linkage rod is assembled inside the second auxiliary hole.

25. The electronic device according to claim 24, wherein the second body comprises a rotatable heat-dissipating cover, the auxiliary bracket is fixedly connected to the rotatable heat-dissipating cover, when the first body rotates relative to the second body, the rotating shaft rotates and drives the linkage rod to link the limiting slider and the auxiliary linkage rod, such that the rotatable heat-dissipating cover is pivotable between an opened position and a locked position.

26. The electronic device according to claim 13, wherein one of the first slide groove and the second slide groove is a linear slide groove, and the other one of the first slide groove and the second slide groove is a curved slide groove or an inclined slide groove, so as to limit a moving direction of the cover.

27. The electronic device according to claim 13, wherein the first body is a display module, and the second body is a host module.

28. The electronic device according to claim 13, wherein the cover is integrally formed and connected to the first body.

* * * * *